Patented Jan. 20, 1953

2,626,339

UNITED STATES PATENT OFFICE 2,626,339

WELDING ROD

Rene D. Wasserman, Stamford, Conn.

No Drawing. Application June 2, 1950,
Serial No. 165,869

2 Claims. (Cl. 219—8)

This invention relates to welding rods and more particularly to welding rods adapted for use in the welding of copper and high copper alloys.

The primary object of the invention is to provide a welding rod adapted for use in the metallic arc welding of copper and high copper alloys by the use of either direct or alternating current, and without preheating of the base metal.

It is also an important point, however, that the novel welding rod is adapted for the welding of copper and high copper alloys by the oxacetylene torch, metallic arc, carbon arc, heli-arc, inert gas, atomic hydrogen, or submerged arc method.

It is a further point that the welding rod may be advantageously used for welding copper and copper alloys to other metals such as iron and alloys containing iron.

The welding of copper and high copper alloys presents many difficulties. The high heat conductivity of the metal tends to dissipate the applied heat quickly by conduction. Copper becomes oxidized at its melting temperature so that the employment of a suitable deoxidizing agent is important.

There are various welding rods on the market which may be used for the metallic arc welding of copper. However, these require preliminary heating of the base metal to a temperature of 500 to 700° F. or more.

The novel welding rod of the present application is unique in the fact that it can be used for metallic arc welding with either alternating or direct current without preheating of the base metal.

The novel welding rod is desirably either of substantially pure nickel or a nickel copper alloy containing approximately 50% or more of nickel with the balance copper. For metallic arc welding, it is important that the rod be coated with a flux composition composed as follows:

| | Per cent by weight |
|---|---|
| Carbonaceous material | from 5 to 15 |
| A heavy metal carbonate | from 15 to 45 |
| A heavy metal fluoride | from 20 to 60 |
| And as a binder, sodium and/or potassium silicate solution | from 12½ to 28 |

In this specification "carbonaceous materials" is used to mean material which provides or produces carbon, such as graphite, charcoal, coke, tar, cellulose, etc. "A heavy metal" is used, in accordance with the practice of the welding industry, to mean barium, calcium or strontium.

A typical example of a welding rod which has been found very satisfactory in use is one in which the rod proper has been composed of 99% nickel and 1% copper with the flux coating composed as follows:

| | Pounds |
|---|---|
| Carbonaceous material | 8 |
| Calcium carbonate | 40 |
| Calcium fluoride | 55 |
| And sodium silicate as a binder, in quantity necessary to make either a dipping solution or heavy paste for extrusion process, the quantity being not less than | 14.7 |

The novel welding rod shows excellent welding characteristics, resulting in a nice wide flat deposit superior generally to those obtainable with the use of prior art welding rods. The soundness of the joint is undoubtedly attributable in considerable measure to the high affinity of copper for nickel. The bond has better corrosion resisting properties than those obtainable with old fashioned but conventional rods composed of copper zinc alloys. The high nickel alloy welding rod is not as difficult to apply as copper zinc alloy, and no dangerous fumes result.

The fact that the novel welding rod can be employed in both alternating current and direct current metallic arc welding is due to the design and formulation of the coating. With the novel electrode it is found to be comparatively easy to apply the weld evenly and continuously without sputter, whether alternating or direct current be employed, and without preheating of the base metal.

Examination of welds so made shows them to be free from objectionable oxidation and substantially free from blow holes.

I have described what I believe to be the best embodiments of my invention. I do not wish, however, to be confined to the embodiments shown, but what I desire to cover by Letters Patent is set forth in the appended claims.

1. A welding rod designed particularly for the welding of copper and high copper alloys, said rod containing between 50 and 100% nickel and the remainder, if any, copper, said rod having a coating which consists of 20 to 60% of a heavy metal fluoride, 15 to 45% of a heavy metal carbonate, 5 to 15% carbonaceous material, and, as a binder, 12½ to 22½% solution of silicate of at least one of the metals of the group consisting of sodium and potassium.

2. A welding rod designed particularly for the welding of copper and high copper alloys, said rod consisting substantially in its entirety of nickel and copper, the nickel constituting from 50 to 99% of the total composition, and a flux coating for said rod comprising carbonaceous material, a heavy metal carbonate and heavy metal fluoride in the proportions by weight of substantially 8 to 40 to 55, together with a suitable binder.

RENE D. WASSERMAN.

REFERENCES CITED

The following references are of record in the file of this patent:

UNITED STATES PATENTS

| Number | Name | Date |
|---|---|---|
| 811,239 | Monell | Jan. 30, 1906 |
| 1,882,601 | Hollup | Oct. 11, 1932 |
| 2,100,545 | Hiemke | Nov. 30, 1937 |
| 2,310,104 | McLott | Feb. 2, 1943 |
| 2,422,489 | Kihlgren et al. | June 17, 1947 |
| 2,499,827 | Kihlgren | Mar. 7, 1950 |

OTHER REFERENCES

Welding Handbook, 1942 Edition, pp. 910–911, American Welding Society, Mack Printing Co.